US008898640B2

(12) United States Patent
Warren et al.

(10) Patent No.: US 8,898,640 B2
(45) Date of Patent: Nov. 25, 2014

(54) EXCEPTION HANDLING FOR A DISTRIBUTED RUNTIME

(75) Inventors: Richard A. Warren, Acton, MA (US); Sudarshan Raghunathan, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 40 days.

(21) Appl. No.: 13/490,290

(22) Filed: Jun. 6, 2012

(65) Prior Publication Data
US 2013/0332907 A1    Dec. 12, 2013

(51) Int. Cl.
*G06F 9/44* (2006.01)
(52) U.S. Cl.
USPC ............... 717/125; 714/11; 714/38; 717/124; 717/127; 709/227

(58) Field of Classification Search
None
See application file for complete search history.

(56) References Cited

U.S. PATENT DOCUMENTS

| | | | |
|---|---|---|---|
| 5,048,018 A * | 9/1991 | Bernstein et al. | 717/131 |
| 6,378,087 B1 * | 4/2002 | Flanagan et al. | 714/38.1 |
| 7,849,359 B2 * | 12/2010 | Martin | 714/11 |
| 8,060,783 B2 | 11/2011 | McAllister et al. | |
| 8,209,419 B2 * | 6/2012 | Ellis et al. | 709/227 |
| 2006/0101411 A1 * | 5/2006 | Selitrennikoff et al. | 717/127 |
| 2009/0319662 A1 | 12/2009 | Barsness et al. | |

OTHER PUBLICATIONS

Shin-ichi Tazuneki and Tataichi Yoshida, COncurrent Exception Handling in a Distributed Object-Oriented Computing Environment, 2000, IEEE, pp. 75-82.*

Acharya, et al., "Mining API Error-Handling Specifications from Source Code", In Proceedings of the 12th International Conference on Fundamental Approaches to Software Engineering: Held as Part of the Joint European Conferences on Theory and Practice of Software, Mar. 22, 2009, pp. 370-384.
Manson, et al., "Dynamic Aspects for Runtime Fault Determination and Recovery", In Proceedings of the 20th International Parallel and Distributed Processing Symposium, Apr. 25, 2006, 8 pages.
Weimer, et al., "Finding and Preventing Run-Time Error Handling Mistakes", In Proceedings of the19th Annual ACM SIGPLAN Conference on Object-oriented Programming, Systems, Languages, and Applications, Oct. 24, 2004, pp. 419-431.
Hoogerwerf, Ronnie, "The "Cloud Numerics" Programming and Runtime Execution Model", Published on: Jan. 11, 2012, Available at: http://blogs.msdn.com/b/cloudnumerics/archive/2012/01/11/the-cloud-numerics-programming-and-runtime-execution-model.aspx.
Ravasi, et al., "JUMP: A Unified Scheduling Policy with Process Migration", In Proceedings of the 28th Brazilian Symposium on Computer Networks and Distributed Systems, May 26, 2010, pp. 349-361.
Dinan, et al., "Selective Recovery from Failures in a Task Parallel Programming Model", In Proceedings of the 10th IEEE/ACM International Conference on Cluster, Cloud and Grid Computing, May 17, 2010, pp. 709-714.
Exception Handling (Task Parallel Library) http://msdn.microsoft.com/en-us/library/dd997415.aspx, 2012 Microsoft, msdn.microsoft.com/en-us/library/dd997415.aspx (6 pages).

* cited by examiner

*Primary Examiner* — Don Wong
*Assistant Examiner* — Roberto E Luna
(74) *Attorney, Agent, or Firm* — Nicholas Chen; Brian Haslam; Micky Minhas

(57) ABSTRACT

Embodiments are directed to handling errors in a distributed software application. In one scenario, a computer system instantiates a distributed application which is configured for execution on multiple different computer systems. The computer system determines that an exception has occurred during the execution of the distributed application on at least one of the computer systems and translates the exception that occurred during distributed execution in a distributed environment into a serial exception that appears to have occurred during serial execution in a serial execution environment. The computer system then presents the translated serial exception to an application developer or other user.

19 Claims, 4 Drawing Sheets

EXCEPTION HANDLING FOR A DISTRIBUTED RUNTIME

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Software applications are typically written using some type of integrated development environment (IDE). The applications are written in one of a variety of different programming languages. Each developer attempts to write code that will not generate any faults or issues during execution. However, in large programs (and sometimes even in small programs), this proves to be very difficult. Accordingly, each programming language has some type of mechanism for handling faults or errors in the programming code. Such errors are especially difficult to manage when coming from software applications that are distributed over multiple different computer systems or multiple different processing threads.

BRIEF SUMMARY

Embodiments described herein are directed to handling errors in a distributed software application. In one embodiment, a computer system instantiates a distributed application which is configured for execution on multiple different computer systems. The computer system determines that an exception has occurred during the execution of the distributed application on at least one of the computer systems and translates the exception that occurred during distributed execution in a distributed environment into a serial exception that appears to have occurred during serial execution in a serial execution environment. The computer system then presents the translated serial exception to an application developer or other user.

In another embodiment, a computer system handles errors in a distributed software application. The computer system instantiates an integrated development environment that allows developers to develop distributed applications, which are configured for execution on multiple different computer systems. The computer system receives an input from the developer indicating that the distributed application is to be executed and determines that an exception has occurred during the execution of the distributed application on at least one of the computer systems. The computer system then translates the exception that occurred during distributed execution in a distributed environment into a serial exception that appears to have occurred during serial execution in a serial execution environment. The computer system also presents the translated serial exception to the developer along with any associated information such as a stack trace or an error message. The translated serial exception allows the developer to perceive that the developer is programming in a serial execution environment while actually programming in a distributed, parallel execution environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
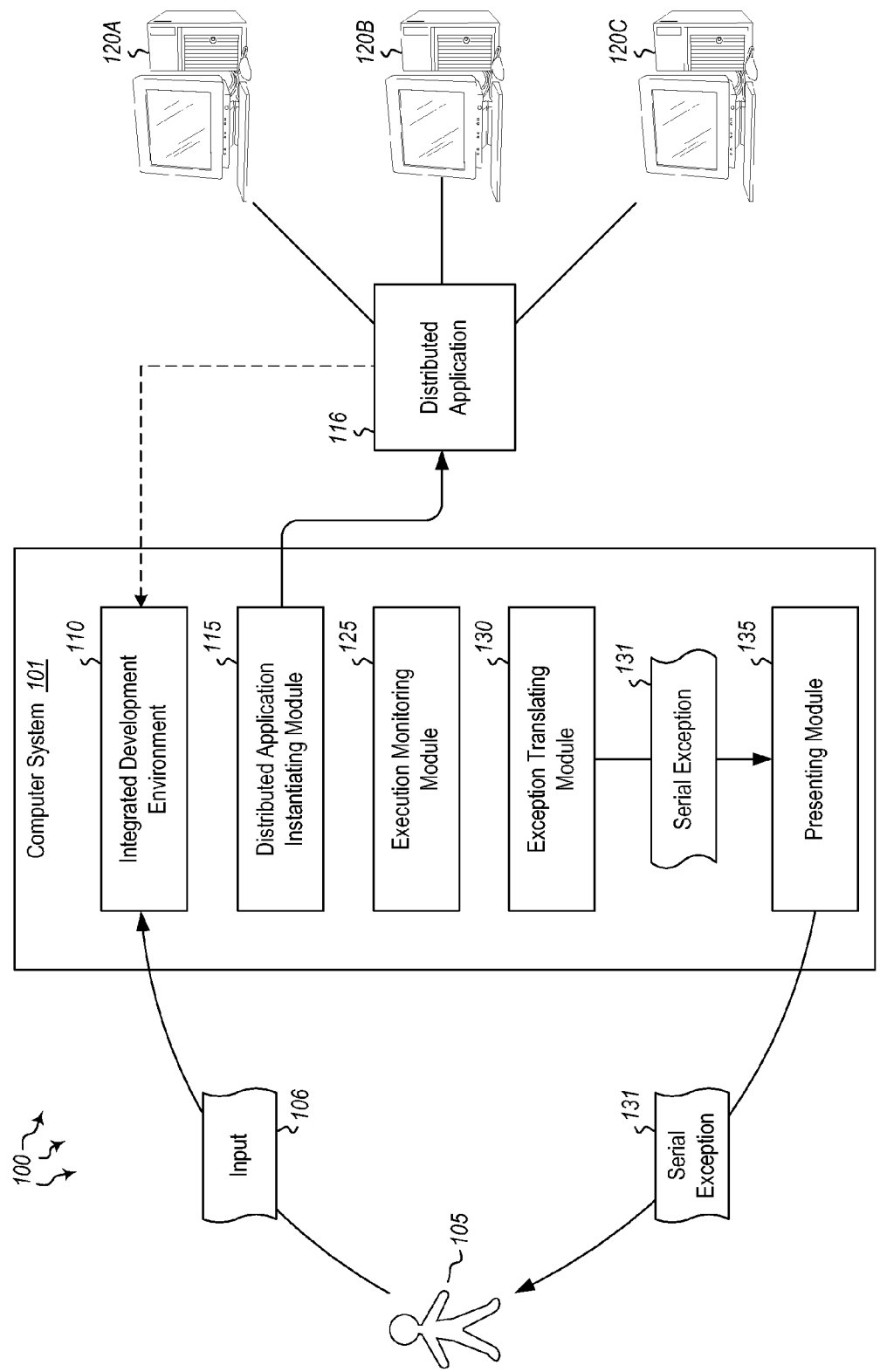
FIG. 1 illustrates a computer architecture in which embodiments of the present invention may operate including handling errors in a distributed software application.

Embodiments described herein are directed to handling errors in a distributed software application. In one embodiment, a computer system instantiates a distributed application which is configured for execution on multiple different computer systems. The computer system determines that an exception has occurred during the execution of the distributed application on at least one of the computer systems and translates the exception that occurred during distributed execution in a distributed environment into a serial exception that appears to have occurred during serial execution in a serial execution environment. The computer system then presents the translated serial exception to an application developer or other user.

In another embodiment, a computer system handles errors in a distributed software application. The computer system instantiates an integrated development environment that allows developers to develop distributed applications, which are configured for execution on multiple different computer systems. The computer system receives an input from the developer indicating that the distributed application is to be executed and determines that an exception has occurred during the execution of the distributed application on at least one of the computer systems. The computer system then translates the exception that occurred during distributed execution in a distributed environment into a serial exception that appears to have occurred during serial execution in a serial execution environment. The computer system also presents the translated serial exception to the developer. The translated serial exception allows the developer to perceive that the developer is programming in a serial execution environment while actually programming in a distributed, parallel execution environment.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 101. Computer system 101 may be any type of local or distributed computer system, including a cloud computing system. The computer system includes various different modules for performing a variety of different functions. For instance, distributed application instantiating module 115 may instantiate distributed applications such as application 116. This distributed application may be distributed over multiple different computer systems including 120A, 120B and/or 120C. These computing systems may be physical or virtual, local or remote. The distributed application may be run as a single unit on a single computer system, or it may be divided into multiple portions which are run on one or more different computer systems.

The execution monitoring module 125 may monitor the execution of distributed application 116. The monitoring may look at the health of the application and may determine whether exceptions or errors are occurring. Errors that occur during parallel or distributed execution may be difficult to manage. More precisely, it may be difficult to determine where exactly the error occurred (i.e. in which portion of the distributed application). The exception translating module 130 may translate any exceptions or errors into serial exceptions. Serial exceptions are those exceptions that would occur during execution of a serial (non-parallel, non-distributed) application. The serial exceptions 131 may be easier for a developer (e.g. user 105) to understand. They may also be better suited to identifying precisely where in a distributed application an error occurred. The presenting module 135 may present the serial exception to the developer in some manner. For example, the presenting module may display the serial exception in a monitor or other display, or may send the exception as data which is displayed by some other application such as an integrated development environment (IDE 110). It should also be noted that exceptions can be handled or trapped inside a serial debugger (typically included in modern IDEs), allowing the user to examine the source of error and possibly resolve it therein.

Embodiments described herein generally provide a means by which parallel algorithm failures can be captured and analyzed by both developers and users. In some cases, parallel applications may be difficult to debug potentially prone to leave users with a paucity of actionable information due to application aborts or hangs, (i.e. the application enters an infinite loop whereby the user is forced to terminate the application by hand). Some embodiments may implement message passing interface (MPI) messages to broadcast errors or exception information. MPI Broadcast is a low level function provided by MPI that provides high performance message passing between processes which may be running on a local symmetric multiprocessor (SMP), on a local cluster, or within an cloud deployment.

Some embodiments may provide MPI-based parallel libraries which implement High Performance Math Libraries for environments such as Microsoft® .NET or Java™ Virtual Machine through programming languages such as C-Sharp (C#), F#, Java, etc. This, in turn, provides users that have minimal or no prior knowledge of parallel systems the ability to program within a client-centric environment. It further allows users to derive the benefits of scale-out performance improvements for large data processing applications. This client-centric user view is made possible by the design and implementation of a runtime infrastructure which hides most of the details of programming with MPI into various programming classes, which are in turn augmented by the distributed error handling mechanism described herein.

Thus, computer system 101 and its various modules may provide an efficient mechanism by which errors can be detected and then processed in a parallel application. The use of a global "AllReduce" function (a reduction operation in which the result of an operation is made available to all participants) provides both an efficient and predictable means by which errors may be globally detected and then processed by a client application. Controlled use of the AllReduce operation during single process multiple data (SPMD) implementation of parallel functions can prevent livelock scenarios (e.g. program hanging) as well as the means by which errors can be transported to a client for processing.

"Collective" operations (or, alternatively, SPMD methods) may be implemented which allow a user task to be invoked synchronously in a distributed environment through the use of MPI broadcast messages. These tasks mirror the client program execution of the specified method. As such, each operation will run in a synchronous manner (this may be particularly true if the user method invokes native code which in turn utilizes the MPI API to move data between distributed parallel processes).

In some embodiments, rules for distributed error handling may be established. When user code is run "collectively" (i.e. invoked on all MPI ranks), the user methods coordinate between themselves to make incremental progress. In other words, at points throughout a distributed computation, a user (e.g. 105) may validate a "global" error status. In some cases, with respect to the timing or frequency of this coordination, independent calculations or memory allocations by each rank may be completed with a global status check. This may be accomplished by invoking the "AllReduce" function as explained above. The AllReduce function exchanges error information between all distributed processes (or portions of a distributed application). Using the AllReduce function in this manner may prevent application hangs as a result of a mismatched MPI communication request. For example, if one or more processes are not participants in a message passing operation (sender with no receiver; or receiver with no sender), the application may hang.

At the first indication of an error, application processes will either stop processing and throw an exception (if executing C# code) or return an error value (if running in native C/C++, Fortran, or similar programming languages). If an invoked "Collective" method cannot determine a "global" error status, then it may invoke an "Abort" method to directly terminate execution of the user program. The parallel Runtime may provide a generic "try/catch/finally" routine around each collective C# invoke operation. As a result, each exception thrown by a user method may be caught. A subsequent AllReduce indicates to all ranks, that an error occurred along with the rank of the "lowest" faulting participant. It should be noted that, while some embodiments are described using the C# programming language, the concepts described herein apply to all programming environments or languages that support an exception handling mechanism similar to that used in C#.

Once the ranks have all decided that an error needs to be handled, the identified rank will communicate the "inner" exception to rank 0 (zero). When the identified rank is the client (also known as rank 0), then no additional communication is needed, and the inner exception will be re-thrown directly by the rank 0 (client/user) process. If however, the identified rank is greater than zero, the inner exception (which represents the actual user code exception) is serialized and communicated via MPI to rank 0 (the user) to be handled in an appropriate manner (i.e. re-thrown for processing by the user application). These concepts will be explained further below with regard to methods 200 and 300 of FIGS. 2 and 3, respectively.

Figure 2:
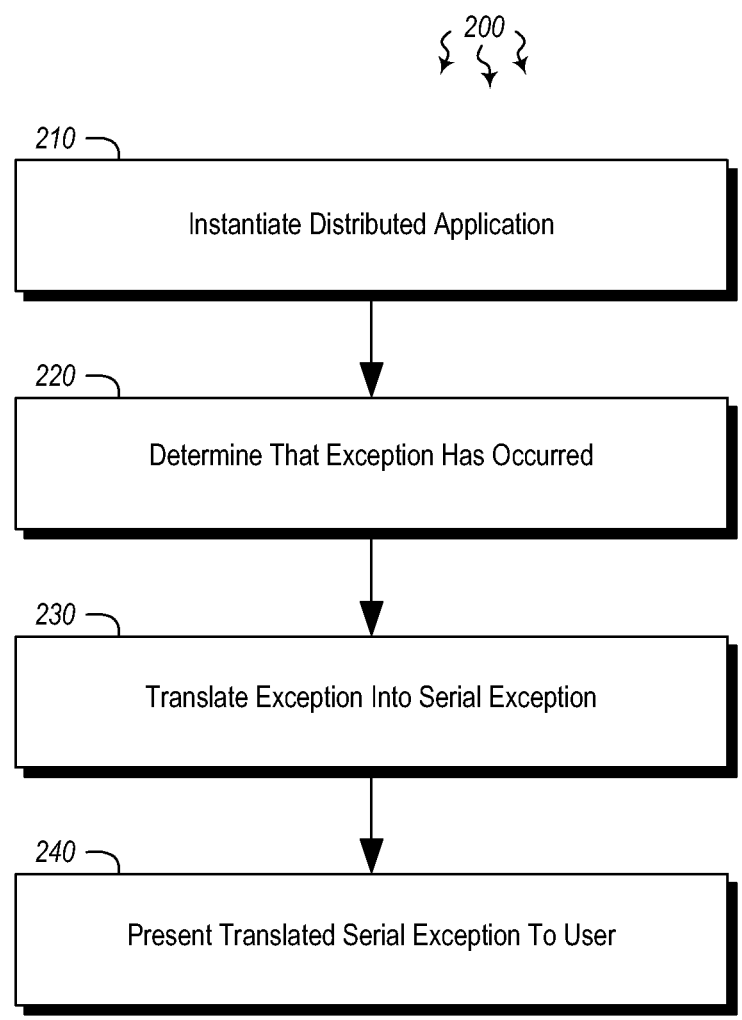
FIG. 2 illustrates a flowchart of an example method for handling errors in a distributed software application.
Figure 3:
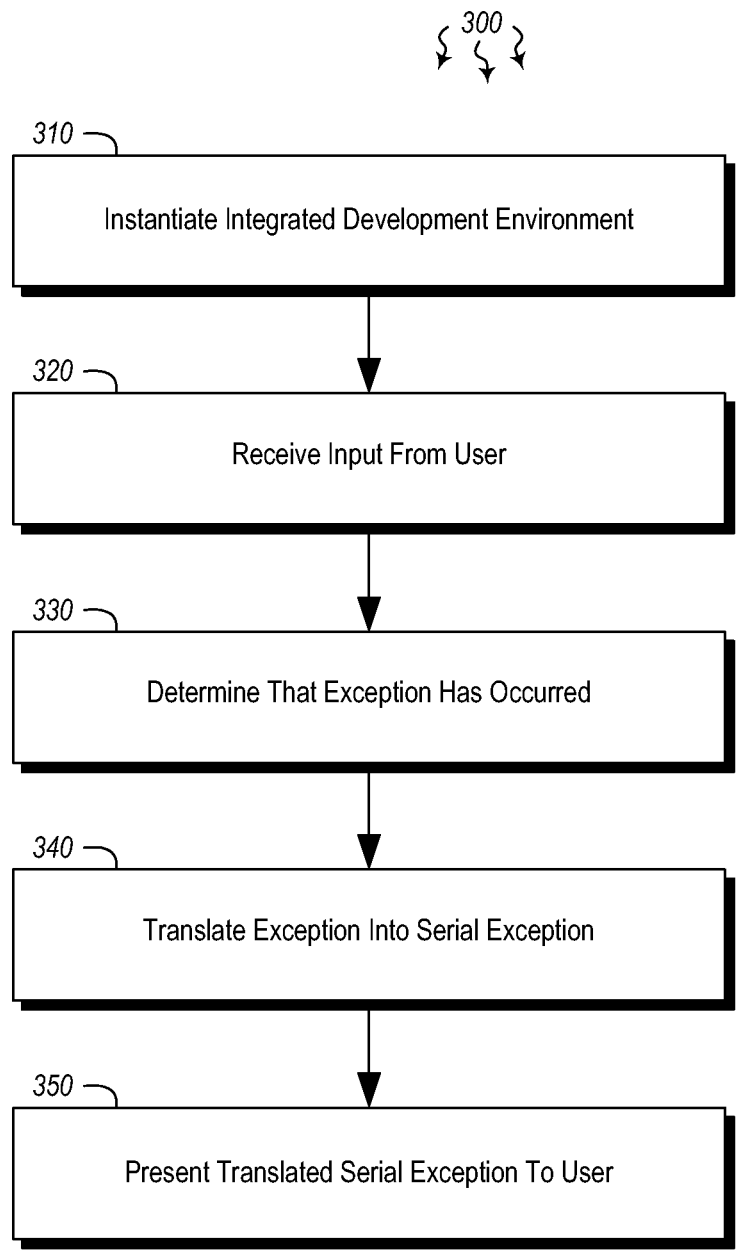
FIG. 3 illustrates a flowchart of an alternative example method for handling errors in a distributed software application.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for handling errors in a distributed software application. The method 200 will now be described with frequent reference to the components and data of environment 100.

Method 200 includes an act of instantiating a distributed application, wherein the distributed application is configured for execution on a plurality of computer systems (act 210). For example, distributed application instantiating module 115 may instantiate distributed application 116. The distributed application may be divided into multiple different portions that are executed on multiple different computer systems (e.g. 120A, 120B and/or 120C). Method 200 then includes an act of determining that an exception has occurred during the execution of the distributed application on at least one of the plurality of computer systems (act 220). Thus, while the distributed application is running, an error or exception may occur on one or more of the application portions.

The execution monitoring module 125 may monitor execution of the distributed application on the various computer systems. The determination that an error has occurred may be made by an exception handler. The errors may be detected globally for the entire application, regardless of where the application portions are actually being processed. For example, if a portion of the application being processed in a remote location throws an error, the error may be communicated to local computer systems so that the error is known globally for the distributed application (and not just known to the portion of the application that is being executed on the remote computer system).

Method 200 also includes an act of translating the exception that occurred during distributed execution in a distributed environment into a serial exception that appears to have occurred during serial execution in a serial execution environment (act 230). For example, exception translating module 130 may translate any exceptions that occur during distributed execution of the application 116. The exception is translated into a serial exception 131 that appears to have occurred during serial (non-parallel or non-distributed) execution in a serial execution environment. Developers are typically much more familiar with serial execution environments; thus, a serial exception may be easier to understand and easier to rectify with the appropriate changes to application code.

In some cases, the translated serial exception 131 is a general exception that indicates to the application developer 105 why the distributed application failed, regardless of whether a portion or the entire distributed application failed. For example, if a user were to run a sequential program in parallel and the program was designed to add two distributed matrices, one possible error that may occur is that one row fails. The translated serial exception may be used to show the developer 105 why the application (in general) and the single row failed. The user sees one exception, regardless of whether one row failed or the entire application failed. This simplicity may be beneficial in understanding the nature of the exception.

Method 200 further includes an act of presenting the translated serial exception to an application developer along with one or more portions of exception data (act 240). Presentation module 135 may be used to present the translated serial exception 131 to the developer 105. The serial exception may also be presented with associated exception data such as error messages, stack trace information or other exception data. The serial exception may be presented in a variety of ways including displaying it on a screen for the developer or sending the information to the developer in a message form or via an application (e.g. integrated development environment (IDE) 110). The translated serial exception presented to the application developer may then be analyzed to determine which one or more errors occurred during execution of the distributed application. The translated serial exception may be analyzed by the developer in a serial programming context.

Based on the developer's analysis of the exception, he or she may draft a portion of software code to fix the determined errors in the distributed application. The portion of software code drafted to fix the determined errors is drafted in a serial programming context. In this manner, the error may be identified, analyzed and fixed in the serial programming context. In some cases, an interpreter may be called as the distributed application is being run and the interpreter may be used to evaluate the distributed application and its corresponding arguments for errors. The interpreter may be an expression evaluator in a debugger such as the interpreter used in the F# programming language.

As mentioned above, distributed application error information is broadcast between distributed application portions and/or to the application developer using one or more message passing interface (MPI) messages. Each distributed computer system may communicate with the others using these MPI messages. Broadcasting these MPI messages may prevent unrecoverable errors (such as segmentation faults) from occurring in the distributed application. This is explained further below with regard to FIG. 3.

FIG. 3 illustrates a flowchart of a method 300 for handling errors in a distributed software application. The method 300 will now be described with frequent reference to the components and data of environment 100, as well as the environment of FIG. 4.

Method 300 includes an act of instantiating an integrated development environment that allows developers to develop distributed applications, the distributed applications being configured for execution on a plurality of computer systems (act 310). For example, integrated development environment (IDE) 110 may be instantiated on computer system 101. The IDE allows developer 105 or other users to develop distributed applications such as application 116. The IDE may receive an input 106 from the developer indicating that the distributed application is to be executed (act 320). The distributed application may then be executed according to the developer's indication.

Method 300 also includes an act of determining that an exception has occurred during the execution of the distributed application on at least one of the plurality of computer systems (act 330). As described above, execution monitoring module 125 may be used to monitor execution of the distributed application 116 and determine when errors occur. Method 300 then includes an act of translating the exception that occurred during distributed execution in a distributed environment into a serial exception that appears to have occurred during serial execution in a serial execution environment (act 340). Exception translating module 130 may be used to perform the exception translation. The resulting serial exception 131 may be presented to the developer, the translated serial exception allowing the developer to perceive that the developer is programming in a serial execution environment while programming in a distributed, parallel execution environment (act 350).

Figure 4:
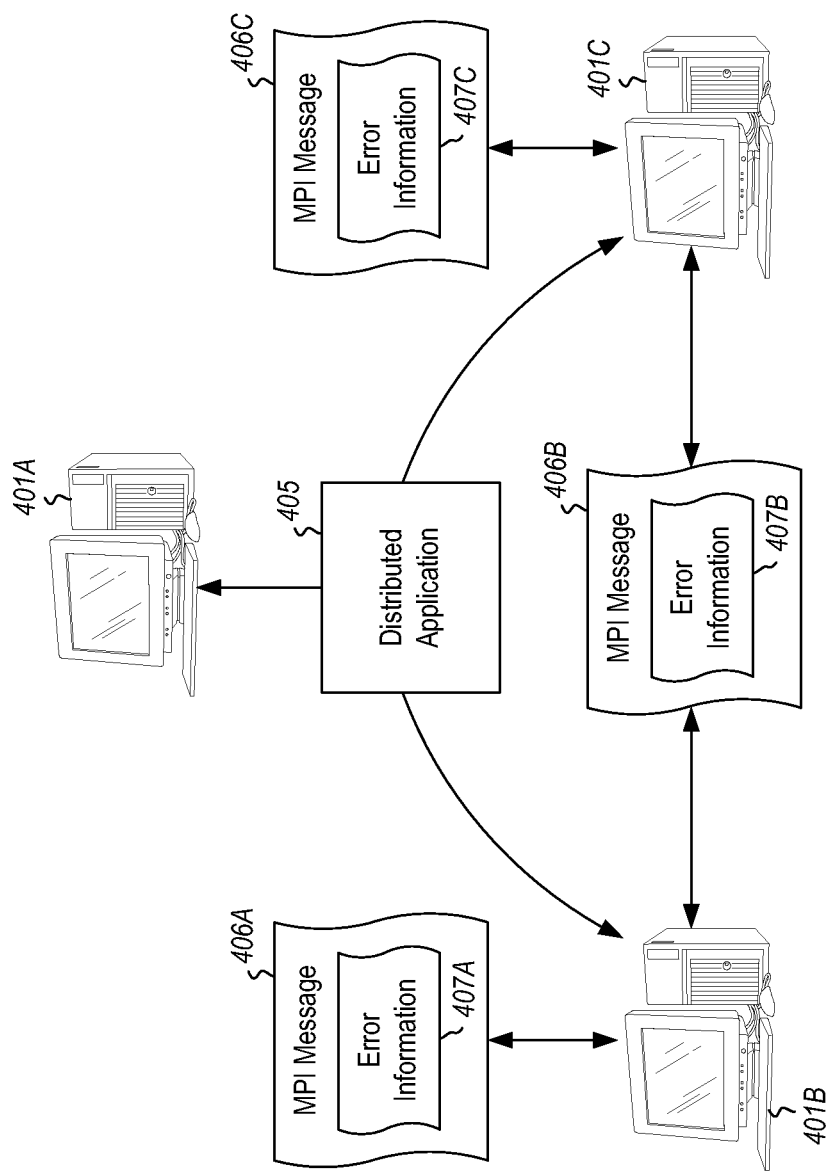
FIG. 4 illustrates an embodiment of the present invention in which error information is communicated between computer systems.

As mentioned above, when errors do occur during the execution of the distributed application, these errors may be communicated between the different executing computer systems (e.g. 401A, 401B and/or 401C in FIG. 4). Computer system 401A may broadcast application error messages between distributed application 405 (or portions thereof) using message passing interface (MPI) messages (406A, 406B and/or 406C). Although shown as being communicated from one computer system to another, the MPI messages 406A-C may be broadcast to substantially any number of computer systems. Each MPI message includes relevant error information for errors that occurred during execution of that corresponding application portion (407A-C).

In some embodiments, the MPI messages with error information are broadcast to different recipients based on rank. The ranks may include at least a rank zero (i.e. the user 105) and one or more other higher ranks (1-n). Each portion of the application then detects the same errors as a result of the error information broadcast from the source of the exception. Errors that are to be sent to lower-level recipients are translated into error messages that are to be sent to higher-level recipients. In some cases, the error detection and translation acts may occur using various different software languages. Those software languages may include at least one language that is designed for high-performance data analysis (such as C#).

Accordingly, methods, systems and computer program products are provided which handle errors in a distributed software application. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for handling errors during a runtime of a distributed software application distributed and executed among a plurality of computer systems, the method comprising acts of:
instantiating at least one computer system an execution monitoring module, and monitoring with the execution monitoring module the distributed application for exceptions while running at the computer systems among which the application is distributed;
upon determining with the execution monitoring module that an exception has occurred during the execution of the distributed application on at least one of the plurality of computer systems passing the exception to an exception translation module and then translating the exception that occurred during distributed execution in a distributed environment into a serial exception that appears to have occurred during serial execution in a serial execution environment, wherein the translated serial exception comprises a general exception that indicates to the application developer why the distributed application failed, regardless of whether a portion or the entire distributed application failed; and
presenting the translated serial exception to an application developer along with one or more portions of exception data.

2. The method of claim 1, wherein the translated serial exception presented to the application developer is analyzed to determine which one or more errors occurred during execution of the distributed application.

3. The method of claim 2, wherein the translated serial exception is analyzed in a serial programming context.

4. The method of claim 1, wherein the method further includes receiving code drafted to fix the determined errors, which is drafted in a serial programming context.

5. The method of claim 1, wherein the determination that an exception has occurred during the execution of the distributed application on at least one of the plurality of computer systems is made by an exception handler.

6. The method of claim 1, wherein the errors are detected globally for each portion of the distributed application.

7. The method of claim 1, wherein distributed application error information is broadcast between distributed application portions using one or more message passing interface (MPI) messages.

8. The method of claim 7, wherein an interpreter is called as the distributed application is being run and wherein the distributed application and its corresponding arguments are evaluated for errors.

9. The method of claim 7, wherein the broadcast MPI messages prevent unrecoverable errors from occurring in the distributed application.

10. A computer-implemented method for handling errors during a runtime of a distributed software application distributed and executed among a plurality of computer systems, the method comprising acts of:
instantiating at least one computer system an execution monitoring module, and monitoring with the execution monitoring module the distributed application for exceptions while running at the computer systems among which the application is distributed;
upon determining with the execution monitoring module that an exception has occurred during the execution of the distributed application on at least one of the plurality of computer systems passing the exception to an exception translation module and then translating the exception that occurred during distributed execution in a distributed environment into a serial exception that appears to have occurred during serial execution in a serial execution environment, wherein the translated serial exception comprises a general exception that indicates to the application developer why the distributed application failed, regardless of whether a portion or the entire distributed application failed; and
presenting the translated serial exception for analysis by a developer, the translated serial exception allowing the developer to perceive that the developer is programming in a serial execution environment while actually programming in a distributed, parallel execution environment.

11. The method of claim 10, wherein distributed application error messages are broadcast between distributed application portions using a message passing interface (MPI).

12. The method of claim 11, wherein the error messages are broadcast to different recipients based on rank.

13. The method of claim 12, wherein the ranks include at least a rank zero and one or more other higher ranks.

14. The method of claim 12, wherein each portion of the application detects the same errors as a result of the broadcast error messages.

15. The method of claim 12, wherein error detection and translation acts occur using at least two different software languages.

16. The method of claim 15, wherein at least one of the software languages is designed for high-performance data analysis.

17. The method of claim 12, wherein errors that are to be sent to lower-level recipients are translated into error messages that are to be sent to higher-level recipients.

18. A computer system comprising the following:
one or more processors;
system memory;
one or more hardware storage devices having stored thereon computer-executable instructions that, when executed by the one or more processors, causes the computing system to perform a method for handling errors in a distributed software application distributed and executed among a plurality of computer systems, the wherein the implemented method comprises the following acts:
instantiating at least one computer system an execution monitoring module, and monitoring with the execution monitoring module the distributed application for exceptions while running at the computer systems among which the application is distributed;
upon determining with the execution monitoring module that an exception has occurred during the execution of the distributed application on at least one of the plurality of computer systems passing the exception to an exception translation module and then translating the exception that occurred during distributed execution in a distributed environment into a serial exception that appears to have occurred during serial execution in a serial execution environment, wherein the translated serial exception comprises a general exception that indicates to the application developer why the distributed application failed, regardless of whether a portion or the entire distributed application failed; and presenting the translated serial exception for analysis by a developer, the translated serial exception allowing the developer to perceive that the developer is programming in a serial execution environment while actually programming in a distributed, parallel execution environment.

19. One or more hardware storage device having stored thereon computer-executable instructions that, when executed by one or more processors of a computer system, causes the computer system to perform a method for handling errors in a distributed software application that is distributed and executed among a plurality of computer systems, the wherein the implemented method includes:

instantiating at least one computer system an execution monitoring module, and monitoring with the execution monitoring module the distributed application for exceptions while running at the computer systems among which the application is distributed;

upon determining with the execution monitoring module that an exception has occurred during the execution of the distributed application on at least one of the plurality of computer systems passing the exception to an exception translation module and then translating the exception that occurred during distributed execution in a distributed environment into a serial exception that appears to have occurred during serial execution in a serial execution environment, wherein the translated serial exception comprises a general exception that indicates to the application developer why the distributed application failed, regardless of whether a portion or the entire distributed application failed; and presenting the translated serial exception to an application developer along with one or more portions of exception data.

* * * * *